United States Patent [19]

Wright

[11] 4,328,107
[45] May 4, 1982

[54] PROCESS AND APPARATUS FOR FORMING DISPERSIONS

[75] Inventor: Frank C. Wright, Hamilton Township, Mercer County, N.J.

[73] Assignee: Synergo, Inc., Philadelphia, Pa.

[21] Appl. No.: 211,325

[22] Filed: Nov. 28, 1980

[51] Int. Cl.³ ............................................. C02F 1/24
[52] U.S. Cl. ................................ 210/703; 210/221.2; 261/76; 261/78 A; 261/DIG. 75; 239/433
[58] Field of Search ............... 261/DIG. 26, 76, 78 R, 261/78 A, 77, DIG. 75, 121 R; 210/758, 754, 703, 221.1, 221.2; 239/433, 592, 593, 594

[56] References Cited

U.S. PATENT DOCUMENTS

| | | | |
|---|---|---|---|
| 1,107,244 | 8/1914 | Carter | 239/433 |
| 2,883,167 | 4/1959 | Krantz | 261/78 A |
| 3,371,618 | 3/1968 | Chambers | 261/DIG. 75 |
| 3,677,525 | 7/1972 | Schurig et al. | 261/77 |
| 3,704,008 | 11/1972 | Ziegler | 261/78 A |
| 4,019,983 | 4/1977 | Mandt | 210/754 |
| 4,112,025 | 9/1978 | Wilson et al. | 261/DIG. 75 |
| 4,162,971 | 7/1979 | Zlokarnik et al. | 261/DIG. 75 |
| 4,226,719 | 10/1980 | Woltman | 261/77 |

FOREIGN PATENT DOCUMENTS 1153725 1/1960 Fed. Rep. of Germany ...... 210/758

Primary Examiner—Benoit Castel
Attorney, Agent, or Firm—Carella, Bain, Gilfillan & Rhodes

[57] ABSTRACT

There is disclosed a novel nozzle assembly comprised of a tapered liquid passageway and a tapered gas passageway of diminishing cross-sectional areas disposed at an angle of from 0° to 90° to one another meeting at the enlarged end of a gas-liquid mixture passageway of diminishing cross-sectional area to an outlet end thereof. Accordingly, separate streams of a pressured gas and a pressurized liquid are introduced into the respective gas and liquid conduits whereby the gas and liquid are accelerated to a high velocity while minimizing velocity head loss and admixed at converging angles to achieve immediate high forward velocity and thus gas-liquid dispersion with the resulting gas-liquid mixture being subsequently accelerated with minimum pressure losses to achieve further gas-liquid dispersion and thus, microbubble production from controlled volumes of gas and liquid. For producing sprays, there is used like nozzle assembly, except that the liquid passageway need not be tapered and without high liquid velocity requirements.

22 Claims, 3 Drawing Figures

PROCESS AND APPARATUS FOR FORMING DISPERSIONS

This invention relates to a process and apparatus for forming dispersions and more particularly to a novel process and apparatus for forming gas bubble dispersions in liquids and liquid dispersions in gases, and an apparatus and process for using same.

BACKGROUND OF THE INVENTION

The separation of solids from another wherein one solid is separated by floating at or near the surface of a fluid, i.e. flotation unit operation has and is employed in a plethora of industries. Originally developed for mineral concentration, flotation techniques have been extended into other fields, e.g. the separation of hulls from wheat kernels, printer's ink from the newspaper pulp, potassium chloride from sodium chloride, etc.

Various assemblies and devices have been used in the formation of microbubbles. Early efforts have been directed to the use of orificed conduits disposed in the lower portion of a tank and into which pressurized air is introduced to form streams of microbubbles in the material being treated such as illustrated in U.S. Pat. No. 3,161,590 to Weis, et al. Alternately, adjustable diffusser and injection assemblies, such as disclosed in U.S. Pat. No. 1,922,920 to Aherne wherein a water and gas stream are contacted and admixed for introduction into a flotation tank.

The use of turbulent flow principles for injecting microbubbles into a sewage effluent using Venturi principles is disclosed in U.S. Pat. No. 4,019,983 to Mandt. Such assemblies and devices are generally designed without liquid flow considerations but primarily bubble formation, and thus not with reference to bubbles per unit volume of liquid. Additionally, microbubble production by pressurization requires large eguipment including pump, tank, pressure relief valves and supporting equipment.

OBJECTS OF THE INVENTION

It is an object of the present invention to provide a novel process and apparatus for forming microbubbles.

Another object of the present invention is to provide a novel process and apparatus for forming microbubbles having reduced liquid requirements for excess microbubble formation.

Still another object of the present invention is to provide a novel process and apparatus for forming microbubbles having reduced pressurizing equipment requirements.

A further object of the present invention is to provide a novel process and apparatus for forming microbubbles which is readily adaptable to existing flotation unit operations.

A still further object to the present invention is to provide a novel process and apparatus for forming microbubbles which is readily adaptable to existing flotation unit operations thereby substantially reducing flotation area requirements.

Yet another object of the present invention is to provide a novel process and apparatus for forming sprays.

Still another object of the present invention is to provide a novel process and apparatus for forming sprays from viscous liquids.

SUMMARY OF THE INVENTION

These and other objects of the present invention for producing microbubbles are achieved by a novel nozzle assembly comprised of a tapered liquid passageway and a tapered gas passageway of diminishing cross-sectional areas disposed at an angle of from 0° to 90° to one another meeting at the enlarged end of a gas-liquid mixture passageway of diminishing cross-sectional area to an outlet end thereof. Accordingly, separate streams of a pressured gas and a pressurized liquid are introduced into the respective gas and liquid conduits whereby the gas and liquids are accelerated to a high velocity while minimizing velocity head loss and admixed at converging angles to achieve immediate high forward velocity and thus gas-liquid dispersion with the resulting gas-liquid mixture being subsequently accelerated with minimum pressure losses to achieve further gas-liquid dispersion and thus, microbubble production from controlled volumes of gas and liquid.

The objects of the present invention for producing sprays are achieved in a like nozzle assembly except that the liquid passageway need not be tapered and without high liquid velocity requirements as more fully herein after described.

BRIEF DESCRIPTION OF THE DRAWINGS

Further, understanding of the present invention will be facilitated by referring to the following detailed description when taken in conjunction with the accompanying drawings wherein.

DETAILED DESCRIPTION OF THE INVENTION

The following detailed description of the drawings is directed to the novel nozzle assembly for producing gas bubble dispersions in liquids, i.e. foams and/or microfoams, followed by a discussion of modification thereof for producing liquid dispersions in gases, i.e. sprays.

Figure 1:
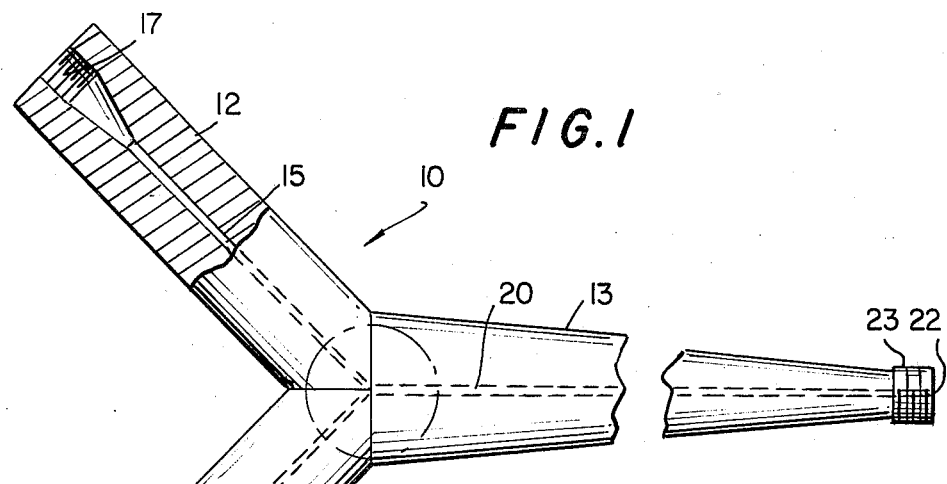
FIG. 1 is a plane view, partially cut-away of the nozzle assembly of the present invention.

Referring now to FIG. 1, there is illustrated a novel nozzle assembly, generally indicated as 10, and comprised of a liquid nozzle portion 11, a gas nozzle portion 12 and a gas-liquid mixture nozzle portion 13. The liquid nozzle portion 11 and gas nozzle portion 12 are formed with a gradually tapered or narrowing passageway 14 and 15, respectively, from threaded inlet sections 16 and 17 thereof to outlet orifices 18 and 19, respectively, with gradually tapered or narrowing being defined as less than a 10° angle between the centerline and surface of the passageways.

The gas-liquid mixture nozzle portion 13 is formed with a tapered or narrowing passageway 20, preferably of small stepwise diameter changes, from an inlet orifice 21 thereof to an outlet orifice 22. The diameter of the liquid nozzle portion 11 and gas nozzle portion 12 are independent of one another and are a function of the intended use considering parameters of fluid volume per second and fluid velocity attainable at design pressure and determines minimum diameter of the end of orifice 22. A terminal portion of the gas-liquid mixture nozzle 13 is formed with an external threaded section 3 for facile insertion into a conduit fitting, as more fully hereinafter described.

The liquid nozzle portion 11 and the gas nozzle portion 12 are disposed to cause axes of the respective tapered passageways 14 and 15 to converge at an angle of from 0° to 90°, preferably 10° to 45°, thereby avoiding high velocity losses when a gas collides with a liquid. The outlet orifices 18 and 19 of the passageways 14 and 15 of the liquid nozzle portion 11 and gas nozzle portion 12, respectively are directed towards the inlet orifice 21 of the gas-liquid nozzle 13 forming a mixing chamber, generally indicated as 24.

Figure 3:
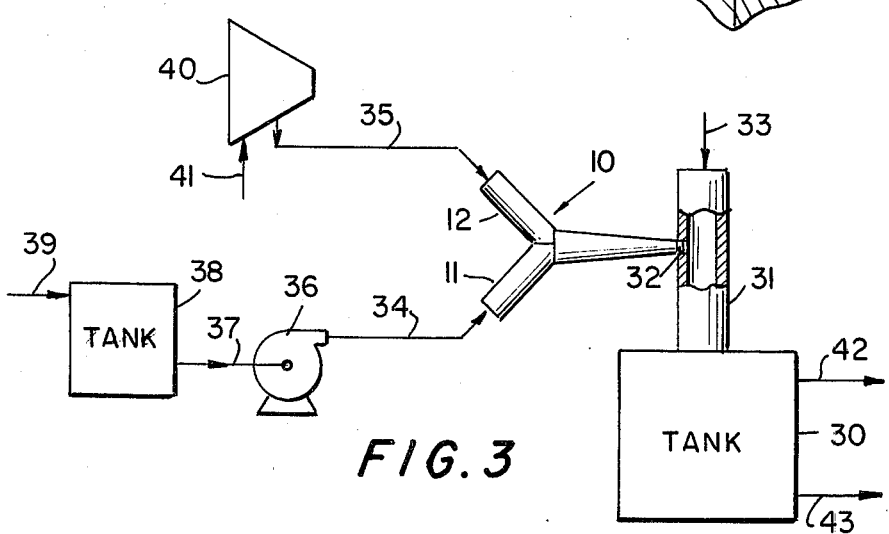
FIG. 3 is a schematic flow diagram of a flotation process and apparatus for using the present invention.

Referring now to FIG. 3, the nozzle assembly 10 is generally used to form microfoam or microbubbles (i.e. bubbles of less than about 0.5 mm in diameter) for introduction into a tank 30 via conduit 31 formed with a nozzle fitting 32 and including a liquid line 33.

The nozzle assembly 10 is provided with a pressurized liquid inlet line 34 and a compressed gas inlet line 35 suitably affixed to the threaded portions 16 and 17 of liquid nozzle portion 11 and gas nozzle portion 12, respectively. The pressurized liquid line 34 is in fluid communication with the discharge side of a pump 36 in fluid communication by line 37 with a tank 38 via the suction side of the pump 36. The tank 38 is supplied by line 39 with the liquid substrate of the liquid portion of the microfoam. The compressed gas inlet line 35 is in fluid communication with the discharge side of a compressor 40 having a gas inlet line 41.

In operation, for example in the separation of solids by floating such as in sewage treatment plants, water in line 34 at a pressure of from 10 to 1000 psigs is introduced into the liquid inlet 16 of the liquid nozzle portion 11 concomitantly with the introduction of compressed air at a pressure of from about 20 to 2000 psigs preferably about 30 to 1000 psigs in line 34 into the inlet portion 17 of the gas nozzle 12.

The separate streams of the water and gas passing through the tapered conduits 14 and 15, respectively, are caused to be accelerated to a high velocity prior to mixing in the mixing chamber 24. Of from 5 to 15 volumes of liquid are admixed with 95 to 85 volumes of gas at the existing pressure. The angle of convergence of the tapered passageways is gradual to minimize velocity head loss while accelerating the streams to such high velocity. The pressurized water and compressed air are mixed at a converging angle, as hereinabove discussed, to achieve immediate high forward velocity in the mixing chamber 24 of the resulting air-water mixture, rather than having the air and water streams collide from opposite directions with a lost velocity and large velocity head loss with a resulting need for high pressure requirements to regain velocity.

The mixture of pressurized water and compressed air are caused to be accelerated to higher velocities during passage through the tapered passageway 20 of the gas-liquid nozzle portion 13. As hereinbefore mentioned, the taper of the conduit 20 is preferably effected by small stepwise diameter changes which achieve increased velocity with relatively little loss in pressure of the water and liquid supply. High velocity movement of the gas-liquid mixture achieves further gas-liquid dispersion, or further microbubble production from the controlled volume of liquid and gas being mixed.

The thus formed microbubbles or microfoam are introduced into line 31 containing raw sewage for solids separation in tank 30 wherein solids are removed by line 42 and clarified liquid by line 43.

Figure 2:
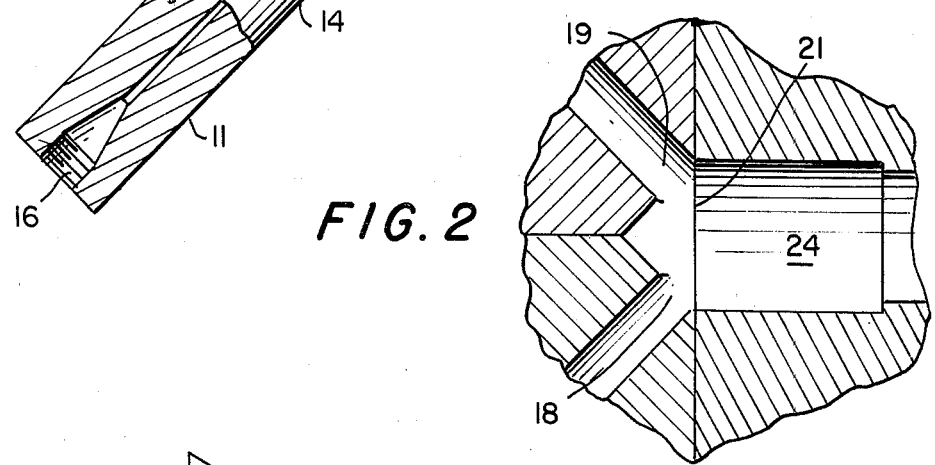
FIG. 2 is an enlarged portion of the circle of FIG. 1.

The novel nozzle assembly 10 of the present invention, as hereinabove described with reference to FIGS. 1 and 2, may be used in the production of a liquid dispersion in gases. However, since the ratio of gas to liquid is greater than that for microfoam production, the liquid need not be accelerated to a high velocity, and thus the passageway 14 of the liquid nozzle portion 11 need not be tapered. The volume of gas for spray production is 50 to 400 times the liquid volume. It is essential to accelerate the gas to a very high velocity and up to and including sonic velocities prior to contacting the liquid in the mixing chamber 24. The volume and energy in foot pounds of the gas stream is much greater than the liquid for spray production. Usually, it is desirable to accelerate the liquid stream in the production of sprays to reduce air volume requirements.

Operation of the process and apparatus is described in the following examples which are intended to be merely illustrative and the invention is not to be regarded as limited thereto.

EXAMPLES OF THE INVENTION

EXAMPLE I

Into nozzle assembly 10 having nozzle portion 11 and 12 (90° contact angle) of 1.5 inches and tapered (4.5°) passageways having exit diameters of 0.16 and 0.06 inches, respectively, there is introduce 4.84 gallons per minute of water at a pressure of 100 psig and 6.5 cubic feet per minute (STP) air at a pressure of 100 psig, respectively. The water and air streams are accelerated to a velocity of 77 and 738 feet per second, respectively, prior to contact in the mixing chamber 4 of a six inch gas-liquid nozzle 13 having a stepwise passageway of 20 of a tapered diameter of from 0.050 to 0.020 inches. Microfoam or microbubbles are withdrawn and passed into the conduit 31 at a velocity of 914 feet/sec. There is produced 7.2 cubic feet per minute of foam at standard temperature and pressure.

EXAMPLE II

One gallon per minute of water is accelerated through an 8° tapered nozzle from an 0.5 inch opening to an exit diameter of 0.031 inches and contacted with 50 SCFM (0.0625 pounds per minute) of air at sonic velocity to form a spray exiting through the gas-liquid nozzle 13.

While the invention has been described in connection with an exemplary embodiment thereof, it will be understood that many modifications will be apparent to those of ordinary skill in the art; and that this application is intended to cover any adaptions of variations thereof. Therefore, it is manifestly intended that this invention be only limited by the claims and the equivalents thereof.

What is claimed:

1. A nozzle assembly for contacting a pressurized liquid and compressed gas which comprises:
   a gas nozzle member having an inlet and outlet orifice and formed with a tapered passageway from said inlet to said outlet orifice of a tapered angle of less than 10°;
   a liquid nozzle member having an inlet and outlet orifice and formed with a tapered passageway from said inlet orifice to said outlet orifice of a tapered angle of less than 10°; and
   a gas-liquid nozzle member having an inlet and outlet orifice and formed with a tapered passageway from said inlet orifice to said outlet orifice of a tapered angle of less than 10°, said gas nozzle member and said liquid nozzle member positioned to cause axes of said passageways of said nozzle members to converge on said inlet orifice of said gas-liquid nozzle member at a contact angle of from 0° to 90°.

2. The nozzle assembly as defined in claim 1 wherein said tapered passageway of said gas-liquid nozzle member is formed of stepwise diminishing diameters.

3. The nozzle assembly as defined in claim 1 wherein said contact angle is preferably between 10° to 45°.

4. A process for forming microfoam, which comprises:
 a. passing a compressed gas through a passageway of diminishing diameter;
 b. passing a pressurized liquid through a passageway of diminishing diameter;
 c. contacting from 95 to 85 volumes of the gas stream of step (a) and from 5 to 15 volumes of the liquid stream of step (b) at a contact angle of from 0° to 90° to form a gas-liquid mixture;
 d. passing said gas-liquid mixture through a passageway of diminishing diameter; and
 e. recovering microfoam from said passageway of step (d).

5. The process as defined in claim 4 wherein said contact angle is between 10° to 45°.

6. The process as defined in claim 4 wherein said liquid is pressurized to a pressure of from 10 to 1000 psigs and said gas is pressurized to a pressure of from 20 to 2000 psigs.

7. The process as defined in claim 6 wherein said liquid and gas pressures are from 30 to 100 psigs.

8. The process as defined in claim 4 wherein said compressed gas is compressed air and said pressurized liquid is pressurized water.

9. A process for producing a spray, which comprises:
 a. passing a compressed gas through a passageway of diminishing diameter;
 b. passing a pressurized liquid through a passageway;
 c. contacting the gas stream of step (a) and the liquid stream of step (b) at a contact angle of from 0° to 90° to form a gas-liquid mixture having a ratio of gas to liquid volume from 50 to 400;
 d. passing said gas-liquid mixture through a passageway of diminishing diameter; and
 e. obtaining a spray comprised of a liquid dispersed in a gas.

10. The process as defined in claim 9 wherein said contact angle is between 10° to 45°.

11. The process as defined in claim 9 wherein gas is pressurized to a pressure of from 20 to 2000 psigs.

12. The process as defined in claim 11 wherein gas pressure is from 30 to 100 psigs.

13. An improved process for separating solids from a liquid of a solids-liquid mixture by flotation, which comprises:
 a. passing a compressed gas through a passageway of diminishing diameter;
 b. passing a pressurized liquid through a passageway of diminishing diameter;
 c. contacting the gas stream of step (a) and the liquid stream of step (b) at a contact angle of from 0° to 90° to form a gas-liquid mixture;
 d. passing said gas-liquid mixture through a passageway of diminishing diameter;
 e. introducing said gas-liquid mixture of step (d) into said solid-liquid mixture; and
 f. floating and separating solids from said liquid of said solids-liquid mixture.

14. The process as defined in claim 13 wherein said contact angle is 10° to 45°.

15. The process as defined in claim 13 wherein said liquid is pressurized to a pressure of from 10 to 1000 psigs and said gas is pressurized to a pressure of from 20 to 2000 psigs.

16. The process as defined in claim 15 wherein said liquid and gas pressures are from 30 to 100 psigs.

17. The process as defined in claim 13 wherein said solid-liquid mixture being treated is raw sewage.

18. The process as defined in claim 17 wherein said compressed gas is compressed air and said pressurized liquid is pressurized water.

19. An apparatus for separating solids from a solids-liquid mixture by flotation, which comprises:
 a means for forming microfoam including a gas nozzle member having an inlet and outlet orifice and formed with a tapered passageway from said inlet orifice to said outlet orifice; a liquid nozzle member having an inlet and outlet orifice and formed with a tapered passageway from said inlet orifice to said outlet orifice; and a gas-liquid nozzle member having an inlet and outlet orifice and formed with a tapered passageway from said inlet orifice to said outlet orifice, said gas nozzle member and said liquid nozzle member positioned to cause axes of said passageways of said nozzle members to converge on said inlet orifice of said gas-liquid nozzle member at an angle of from 0° to 90°;
 means for compressing a gas;
 means for introduction of said compressed gas into said inlet orifice of said gas nozzle member;
 means for pressurizing a liquid;
 means for introducing said pressurized liquid into said inlet orifice of said liquid nozzle member;
 means for holding the solids-liquid mixture;
 means for introducing microfoam into said solids-liquid mixture whereby solids float to the top of said holding means; and
 means for withdrawing a liquid and floating solids from said holding means.

20. The apparatus as defined in claim 19 wherein gas nozzle member and said liquid nozzle member converge at an angle of from 10° to 45°.

21. The apparatus as defined in claim 19 wherein said means for compressing said gas and pressurizing said liquid increase pressure of from 30 to 100 psigs.

22. The apparatus as defined in claim 19 wherein said solids-liquid mixture is sewage sludge.

* * * * *